Nov. 30, 1965 D. F. SEEMANN ETAL 3,221,107

PBX-GROUP HUNTING FOR ELECTRONIC SWITCHING SYSTEMS

Filed Oct. 22, 1962

4 Sheets-Sheet 1

INVENTOR.
D.F. SEEMANN, E.G. PLATT
W.K.C. YUAN, N.V. MANSUETO

BY

ATTORNEY

PBX-GROUP HUNTING FOR ELECTRONIC SWITCHING SYSTEMS

Filed Oct. 22, 1962

4 Sheets-Sheet 2

3,221,107
PBX-GROUP HUNTING FOR ELECTRONIC SWITCHING SYSTEMS

Donald F. Seemann, Lockport, Eric G. Platt, Worth, William K. C. Yuan, La Grange, and Nicholas V. Mansuetto, Lisle, Ill., assignors to International Telephone and Telegraph Corporation, New York, N.Y., a corporation of Maryland Filed Oct. 22, 1962, Ser. No. 231,892
17 Claims. (Cl. 179—18)

This invention relates in general to PBX-group hunting arrangements and in particular to sequential and/or random PBX-group hunting arrangements for electronic switching systems.

Generally, electronic switching networks include a plurality of cross-points interconnected to provide many alternative paths from any inlet of the network to any outlet of the network. One particular type of network for electronic switching systems is a self-seeking network which has the ability to select a particular one of the many alternative paths between any two end-marked points without any in-network controls being required to complete a switch path between any desired inlet and outlet.

The details of such a network are shown in U.S. Patent No. 3,204,044 issued August 31, 1965, to Virgle E. Porter, entitled, "Electronic Switching Telephone System."

These self-seeking networks are interposed between subscriber lines and switch-path controlling links. The principle is that one of many links is assigned to serve the next call and a first path finds its way from a calling line through the network to the assigned link. There certain call functions are completed, and then a second path finds its way from the called line through the network to the same link. The link joins the two paths and a conversation may follow.

In keeping with the electronic speeds encountered with a self-seeking network, it is necessary that the line circuits associated therewith be capable of being energized and a call extended therethrough at similar speeds. Accordingly, in electronic line circuits, the conventional busy or idle marking techniques are obsolete and electronic controls must be utilized for these markings. Details of a typical line circuit having the above electronic controlled busy and idle marking arrangements are shown in detail in a co-pending U.S. patent application of N. V. Mansuetto, D. F. Seemann, E. G. Platt, W. K. Yuan, entitled, "Electronic Switching Telephone Network," filed August 13, 1962, and assigned Serial No. 216,636.

One of the many services offered by telephone companies is termed PBX-group service. This service provides a subscriber, usually a business concern, with two or more lines which can be reached by dialing a single telephone number. If the first line of the PBX-group is busy, the call will be extended automatically to the next one of the lines and so on until an idle line is found unless all lines are busy. This transferring of the call from one line to another within the PBX-group in search for an idle line is termed hunting and consists of testing one line after another. These PBX-groups may be arranged in various ways so that certain lines may or may not be given preferences, or that hunting will or will not take place unless the master number is dialed.

Since electronic line circuits function at electronic speeds under normal call-handling operations, problems arise in adapting these line circuits for PBX-group line hunting operations wherein the noted test of line after line must be accomplished within very short time intervals usually provided in electronic switching apparatus. It is accordingly an object of this invention to provide a PBX-group line-hunting arrangement adapted for use with electronic line circuits.

In conventional step-by-step PBX-group hunting, the lines assigned a PBX-group can be tested sequentially. This is often accomplished by connecting the lines of a PBX-group to a group of successive outlets on a stepping switch or on a counting chain. However, in electric systems using electronic line circuits, the physical switch positions are no longer available and hunting must be performed in a different manner. It is thus another object of this invention to provide PBX-group hunting over a group of electronic line circuits in a sequential or a random manner.

It is still another object of this invention to provide a PBX-group hunting arrangement wherein certain of the PBX-group lines are assigned sequential hunting and certain other lines in the same PBX-group are assigned random hunting.

Still another object is to provide a PBX-group random hunting arrangement wherein the specific called line of the PBX-group has preference over all other line circuits of the group even though all line circuits are arranged for random hunting.

Normally, PBX-group sequential-type hunting requires some form of counting arrangement, such a ring counter, relay chains or stepping switches, which arrangements increase the cost of providing PBX-group service. It is another object of this invention to provide a PBX-group sequential-hunting arrangement wherein no counting arrangemet is required to sequentially control the preference of PBX-group lines.

Other objects and features will become apparent and the invention will be best understood when the specification is read in conjunction with the accompanying drawings comprising FIGS. 1 to 7 wherein.

Figure 1:
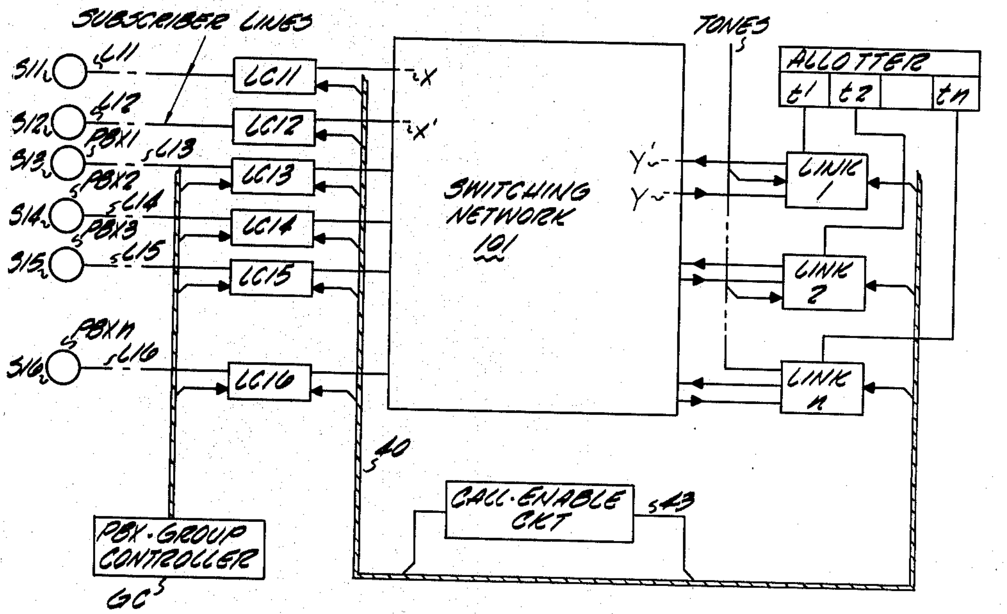
FIG. 1 shows a block diagram of an electronic switching system embodying the principles of the invention.

Referring now to FIG. 1 of the drawings, a brief description of the operation of one type of electronic switching system will be given.

The telephone system in FIG. 1 utilizes a self-seeking network 101 of the type disclosed in the above-identified V. Porter patent.

Subscriber line circuits, such as LC11 to LC16, connect to one side of the network 101 at points, such as "X," and connection-controlling links, such as link 1 to link N, connect to the other side of the network at points, such as "Y." The link circuits are allotted in sequence by individually associated time-frame signals produced by a free-running marker or allotter. The links and line circuits are effectively associated with each other over conductors in cable 40 to exercise the necessary controls in establishing a connection. A call-enable circuit is associated with the noted conductors and aids in the noted control in establishing a connection.

Each subscriber line, such as L11 to L16 and associated stations S11 to S16, is connected to a separate line circuit which recognizes an "off-hook" calling condition and applies an end-marking potential to the line side of the network 101, for example at point "X." A connection is then extended through the network 101 to a point, such as "Y," which is connected to an idle link which is then currently allotted by the allotter. Thereafter, the link returns dial tone to the calling subscriber and receives the desired number information. The link circuit responds to the dialed information, and over conductors in cable 40 and the call-enable circuit, marks and controls the line circuit of the called line at a predetermined time interval when the calling link is again allotted. The called line circuit, if idle, places an end-marking potential on the network, for example at point "X′" and another path is extended through the network to a point such as "Y′" which is connected to the calling link. Thereafter, the called line is signalled and the calling and called parties may converse through the noted calling link.

As seen in FIG. 1, any desired line circuit may be assigned for PBX-group service by connecting it to control apparatus, such as controller GC. If a line, such as L13, assigned PBX-group service is called and is busy, one of the other lines L14 to L16 is next selected automatically to receive the call. The particular line to be selected will be dependent upon the type of preference assigned such lines. If the selection is on a sequential basis, line circuit L14 will be selected and if on a random basis, the first one of lines L14 to L16 to switch-through the network will receive the call.

The following description will describe in detail the operations involved in handling PBX-group calls to lines assigned various type of group-hunting arrangements.

Figure 2:
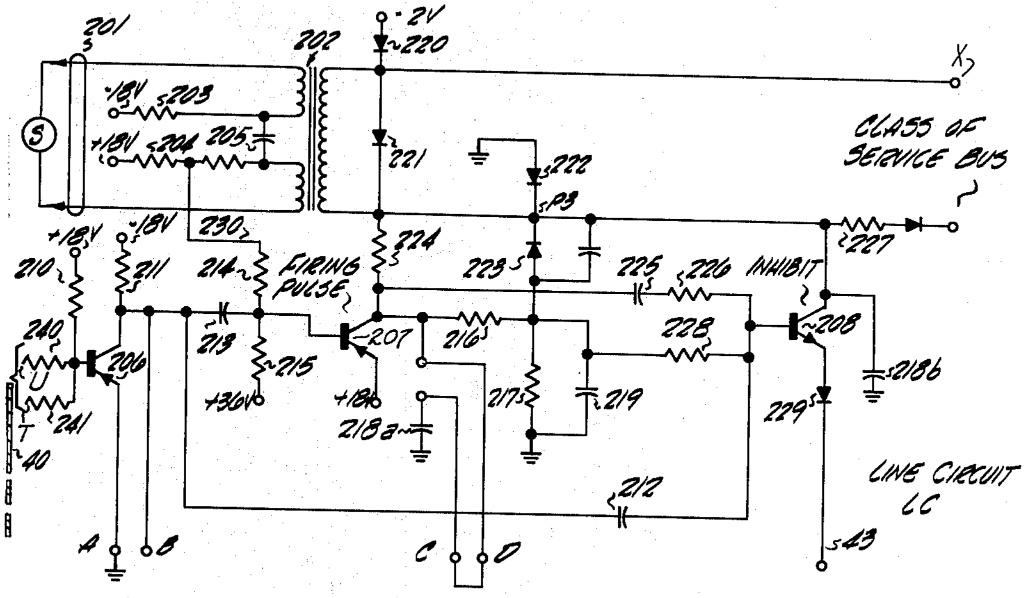
FIG. 2 shows a circuit diagram of a line circuit adaptable for use as a regular line circuit or as a PBX-group line circuit for sequential hunting, random hunting or combinations thereof.

*Line circuit, FIG. 2*

Referring now to FIG. 2 of the drawings, the operation of a typical line circuit will be described. In this portion of the description, terminal A will be grounded, terminal B will be unconnected and terminals C and D will be strapped together.

The line circuit LC includes a transformer 202 for coupling line 201 and its associated station S to the input section of the switching network assigned such line. Resistors 203 and 204 supply direct-current talking battery to the line and station and condenser 205 provides an A.C. bypass connection around the battery source, not shown.

The line circuit LC includes three electronic switches 206, 207 and 208 which may be, for example, junction type transistors. In the normal condition, a negative potential is present on the input leads of the terminate-input switch 206, normally maintaining it in its "on" condition. The other switches 207 and 208 are normally in their "off" condition. The terminate-input switch 206 is part of an "AND" gate which when switched to its "off" condition indicates that such line circuit is being called. Switch 207, when switched to its "on" condition, whether by the noted switching "off" of switch 206 or by the "off-hook" condition of the associated subscriber, generates a firing pulse which is fed to the switching network to initiate a self-seeking path therethrough. Switch 208 is operated under certain conditions to inhibit the effect of this firing pulse.

*Originating call operation*

When a call is initiated by station S on line 201, direct current flows through resistors 203 and 204 causing a potential to appear on conductor 230, which potential passes through resistor 214 and drives the base of transistor 207 negative with respect to its emitter.

Transistor 207 switches to its "on" condition and the positive potential on its emitter appears on its collector. Condenser **218*a* is used to slow down the switch "on" time of transistor 207 so that the network elements will not fire through at this time. This collector potential, through condenser 225 and resistor 226, drives the base of transistor 208 more positive than the emitter to cause transistor 208** to immediately switch to its "on" condition.

A potential normally present on conductor 43 and on the emitter of transistor 208, passes through transistor 208 and appears at point P3. At the same time current flows from ground through resistors 216 and 217 and condenser 219 to the collector of transistor 207 causing a potential to appear, through resistor 228, on the base of transistor 208, to hold it in its noted "on" condition. The potential at point P3 does not reach the emitter potential value of transistor 207 since point P3 is clamped to the noted potential appearing on conductor 43. Thus, the potential appearing on point "X" of the switching network is insufficient to cause firing through the network.

The line circuit LC remains in this condition until the call-enable circuit of FIG. 1 removes the clamping potential from conductor 43 or until the calling subscriber removes the "off-hook" condition.

As described in the noted N. Mansuetto et al. application, when the allotter of FIG. 1 allots an idle link, the noted clamping potential is removed from conductor 43 thereby removing the clamping potential from point P3. The potential on the collector of transistor 207 is then extended through resistor 224 and appears on point P3. At this time, condenser **218*b* functions in response to the resulting change in potential at point P3 to control the slope of a firing pulse which is passed through the winding of transformer 202 to point "X" to cause a self-seeking path to be fired through the switching network to the then-allotted link. When a path is fired through the switching network, current flow through series-connected resistors 217, 216 and 224 holds the switching network elements in their switched condition. An A.C. bypass circuit extends through diode 223 and condenser 219** to ground.

The potential at the junction of resistors 216 and 217 changes sufficiently to switch transistor 208 to its "off" condition. At this time, transistors 206 and 207 are in their "on" condition and transistor 208 is in its "off" condition.

When the time interval for allotting a link has elapsed, clamping potential is again placed on conductor 43. This potential is not effective in the calling line circuit since it is prevented from reaching point P3 as a result of transistor 208 being in its "off" condition.

If no path was successfully fired through the switching network, as from a result of internal blocking or another originating call having already seized the allotter link, and the calling subscriber did not end the call, transistor 208 remains in its "on" condition and point P3 is clamped to the noted potential appearing on conductor 43.

During the next allotting time interval, the noted clamping potential is again removed; the firing pulse is again extended to point "X," and a self-seeking path is again fired through the network. If a path is completed during this allotting interval, transistor 208 is switched to its "off" condition as before described. If a path is not found through the switching network, the clamping potential reappears on conductor 43 and prevents point P3 from attempting another self-seeking path until such clamping potential is again removed by the allotting equipment on its next allotting operation.

Assuming a path to have been fired through the switching network and the allotted link to have been seized, dial tone is returned to the calling subscriber S and the dialing operations are then completed in the manner described in the noted N. Mansuetto et al. patent application. During the dial pulse interruptions, transistor 207 switches "off" and "on," changing the potential at point P3 to provide dialing pulse informations to the seized link. During each dial pulse interruption that transistor 207 is in its "off" condition, current flow through diode 222 provides a holding current for the operated elements of the switching network.

After the dialed digits are stored in the link, the call is extended to the desired party in accordance with the digit information recorded.

*Terminating call operation*

The operation of line circuit LC in responding as a called line will now be described.

As previously noted, line circuit LC normally has a negative potential appearing on each of the T and U conductors associated with the terminate-input transistor 206, which is normally in an "on" condition. As before noted, at this time, transistors 207 and 208 are normally in their "off" condition.

The line circuit of a called line is energized by the appearance of a ground potential on both the T and U conductors simultaneously, driving the base of the terminate-input transistor 206 positive with respect to its emitter. Transistor 206 switches to its "off" condition. Thereafter, ground potential from the emitter of the terminate-input transistor 206 appears on its collector. This ground potential appears through condenser 212 and maintains transistor 208 in its "off" condition. At the same time, this ground potential, through condenser 213, drives the base of transistor 207 more negative than its emitter, causing transistor 207 to switch to its "on" condition.

The potential on the emitter of transistor 207 appears on its collector and the potential at point P3 rises toward the collector potential to cause a self-seeking path to be switched through the switching network. The slope of the rise is controlled by condenser **218*a* the same way that the slope of the originating call firing pulse is controlled by condenser 218*b*. At this time, transistor 208 does not switch to its "on" condition since the noted potential through condenser 212 maintains its switched "off." Since transistor 208 is maintained in its "off" condition, the noted clamping potential on conductor 43** is blocked from point P3. Thus, the appearance of ground marks on conductors T and U, cause the generation of a firing pulse which causes a connection to be extended between the called line circuit and the link seized by the calling line.

None of the other line circuits can simultaneously initiate a call condition through the switching network since transistor 208 in all other line circuits available to initiate a call are operated and the noted clamping potential prevents the effective generation of a firing pulse.

After the called line circuit is connected to the same link as the calling line, the called station is signalled. When the called party answers, conversation may be carried on between the calling and called stations.

After the noted firing pulse is generated in the called line circuit, the marking potentials disappears from the T and U conductors and the terminate-input transistor 206 switches back to its normal "on" condition.

When the called party answers, as above noted, transistor 207 switches to its "on" condition. This causes a change in potential at point P3 to signal an answer condition to the connected link. During conversation, transistors 206 and 207 in the called and calling line circuits are in their "on" condition and transistor 208 in each of these circuits is in its "off" condition.

Disconnect by the calling and called parties cause transistor 207 to switch to its "off" condition, thereby generating a disconnect signal to the link which returns all operated equipment to their normal conditions.

In the event the called line is busy, the appearance of ground marks on conductors T and U would cause the terminate-input transistor 206 of the called line circuit to switch to its "off" condition and place potentials on the bases of transistors 207 and 208. This potential is similar to the potentials already on these bases as a result of the noted potentials on conductor 230. Thus, no change occurs in the line circuit of a busy line sufficient to generate a firing pulse and after the allotting interval has elapsed, the noted marks on conductors T and U disappear.

Figure 3:
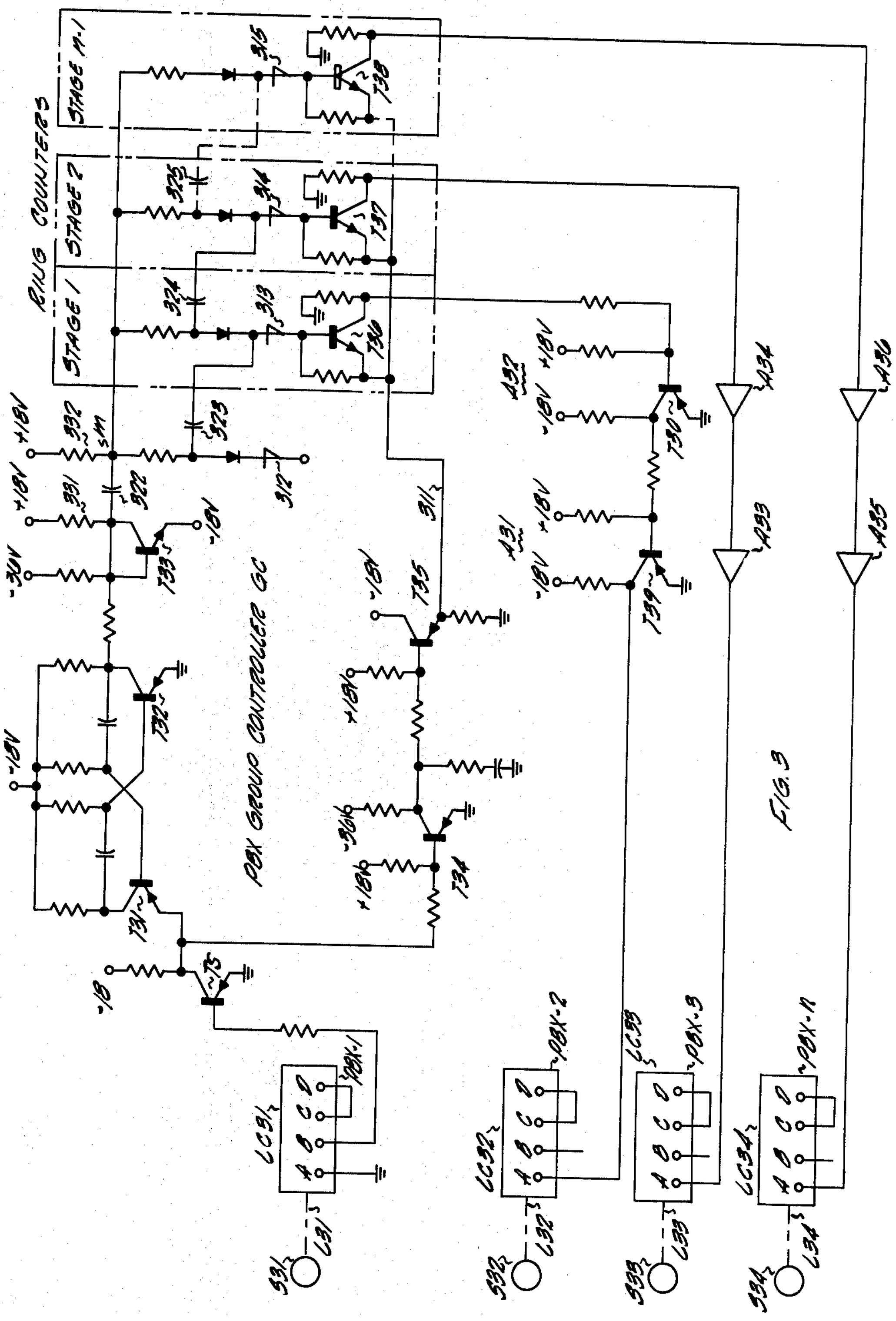
FIG. 3 shows a circuit diagram of a sequential-hunting type PBX-group arrangement employing a group controller for determining and controlling line preferences on PBX-group calls.

*PBX-group sequential hunting, FIG. 3*

Referring now to FIG. 3 of the drawings, the operation of the system in handling a PBX-group call will be described. FIG. 3 is arranged such that if a master station is called and is busy, the call will automatically be transferred to the next idle one of the lines in the PBX-group.

Assume that lines L31 to L34 have been assigned as PBX-group lines with the main or master line being L31 and with lines L32 to L34 being in the order of preference of their numbering. Then, when a call is extended to the line circuit LC31 and such circuit is idle, the call will be completed thereto. However, if such line is busy, line L32 will be the next one to receive the call. If line L32 is idle, the call will be completed thereto. If, however, line L32 is busy, the call will then be advanced to line L33, and so on.

If one of the lines L32 to L34 is first called, the connection will be extended to such line if idle. If one of the called lines L32 to L34 are busy, no other lines will be called and busy tone will be returned to the calling line.

The noted sequential allotting of the call to the first idle one of the lines assigned a PBX-group in a given sequence, when the master station is called, is accomplished by the PBX-group controller GC. In this position of the description it is assumed that the terminals A to D of the line circuits are connected as shown, with the terminal A of the station selected as the master station being connected to ground as is the case in the line circuit of FIG. 2.

The PBX-group controller includes a start circuit, an astable circuit for generating a series of stepping pulses, a multi-stage counter and a counter control circuit. The number of stages in the counter, other than the idle position, corresponds to one less than the number of lines in the PBX-group. The master line of the PBX-group is connected to the input of the controller GC and the remaining lines of the PBX-group are connected to respective counter stages through individual switch stages. In the normal condition, start transistor TS is in its "off" condition since the ground potential from terminal A of the terminate-input transistor appears on terminal B which is connected to transistor TS. At this time, transistors T32, T33, T34, T39 and the transistors in A33 and A35 are in their "on" condition. The remaining transistors are in their "off" condition.

When the master line L31 (PBX–1) is called, the marking ground potentials appearing on the T and U leads cause the noted terminate-input transistor to switch to its "off" condition in the manner described in connection with FIG. 2. This causes a ground potential to appear on the B terminal which in FIG. 2 was unconnected, but in FIG. 3 is shown connected to the base of transistor switch TS.

Transistor TS switches to its "on" condition and drives the base of transistor T34 positive with respect to its base thereby switching T34 to its "off" condition.

At the same time, transistor TS drives the emitter of transistor T31 positive with respect to its base, causing transistor T31 to switch to its "on" condition.

Transistors T31 and T32 comprise a well-known flip-flop circuit in which only one transistor is in its "on" condition at one time. Therefore, transistor T32 switches "off" and after a short time delay, determined by the characteristics of the components in the circuit, transistor T31 switches "off" and transistor T32 switches "on." This alternate operation of transistors T31 and T32 continues as long as transistor TS remains switched "on."

When transistor T34 is switched "off," the base of transistor T35 is driven negative with respect to its emitter and transistor T35 switches "on," thereby extending a negative potential on wire 311 to the emitters of the transistors in the ring counter stages.

If the called master line circuit LC31 (PBX–1) is idle, the noted line-circuit firing pulse will cause a path to be attempted through the switching network. After such a path is found, the ground marks on wires T and U disappear and transistor TS then switches to its "off" condition, restoring the PBX-group controller GC to its idle condition.

If the master station line circuit PBX-1 is busy, the next succeeding line circuit LC32 (PBX–2) is conditioned to generate a firing pulse for extending a connection therefrom to the calling line. The manner in which line circuit LC32 is conditioned to extend a connection will now be described.

As transistor T32 is switched "off" and "on," transistor T33 switches "on" and "off" in step therewith to drive the noted ring counter step-by-step.

The ring counter portion of the controller GC includes a plurality of stages each having a PNPN diode, such as 312 to 315, and a condenser, such as 322 to 324 associated therewith. In the rest position, PNPN diode 312 is the only such diode conducting.

When transistor T33 switches "off," a positive potential is applied through high-valued resistor 331 to one side of condenser 322, the other side of which is connected to a positive potential through a low-valued resistor 332. Therefore, with the ratio of resistance between the noted two resistors, a small positive potential pulse appears at point *m*, which potential is insufficient and of the wrong potential to fire the PNPN diodes 313 to 315. Therefore, no change occurs in the ring counter.

When transistor T33 switches "on," a negative potential from its emitter appears immediately on one side of condenser 322, generating a large negative potential pulse at point M which causes diode 312 to switch "off."

Shortly thereafter, the charge on condenser 323, and the potential on wire 311 causes diode 313 to fire, resulting in transistor T36 switching to its "on" condition. Since condensers 324 and 325 are not charged, none of the other PNPN diodes 314 and 315 will conduct.

The next "off-on" switching of transistor T33 causes diode 313 and condenser 324 to respond in the same manner as the corresponding diode 312 and condenser 323 responded before. In this manner, the counter is advanced step-by-step through all its positions as long as transistor TS is maintained in its "on" condition.

When transistor T36 is switched "on," the base of transistor T30 is driven negative with respect to its base and transistor T30 is switched "on." This causes transistor T39 to switch "off" and remove ground potential from terminal A of the second line circuit LC32 in the group of sequentially connected line circuits.

When ground disappears from terminal A of line circuit LC32, the noted terminate-input transistor thereof, similar to transistor 206 of FIG. 2, is switched "off" and an effective firing pulse is thus generated in line circuit LC32.

If line circuit LC32 (PBX–2) is idle and a path is completed therefrom to the calling link, transistor TS is switched "off" and transistors T34 and T35 switch to their opposite condition to remove the ring counter holding potential from the emitter of each of the ring counter transistors T36 to T38, restoring the ring counter to its normal idle condition.

If the line circuit LC32 (PBX–2) is busy, the next "off-on" switching of transistor T33 advances the ring counter one step, thereby switching transistor T30 of A32 to its normal "off" condition and switching the transistor not shown, of A34 to its "on" condition. This causes ground to be re-established on terminal A of line circuit LC32 rendering it inactive and removing the ground from terminal A of the next succeeding line circuit LC33 (PBX–3). This switches the terminate-input transistor of LC33 to its "off" condition and LC33 generates a firing pulse.

The same sequence of operation is continued until all of the lines of the PBX-group have been rendered effective on a one-at-a-time basis in a predetermined order or until one of the line circuits completes a path to the calling link.

The time intervals of the flip-flop circuit, comprising transistors T31 and T32, are set such that the ring counter is advanced through all stages within the time duration of the ground marks on the T and U conductors of the line circuits.

When a path is fired through the switching network from one of the line circuits of the PBX-group, transistor TS is switched "off" and the PBX-group controller GC is returned to normal. In this manner, the first idle one of the PBX lines is seized in a predetermined order of sequence according to their assignment to the counter stages of the PBX-group controller GC.

Figures 4, 6:
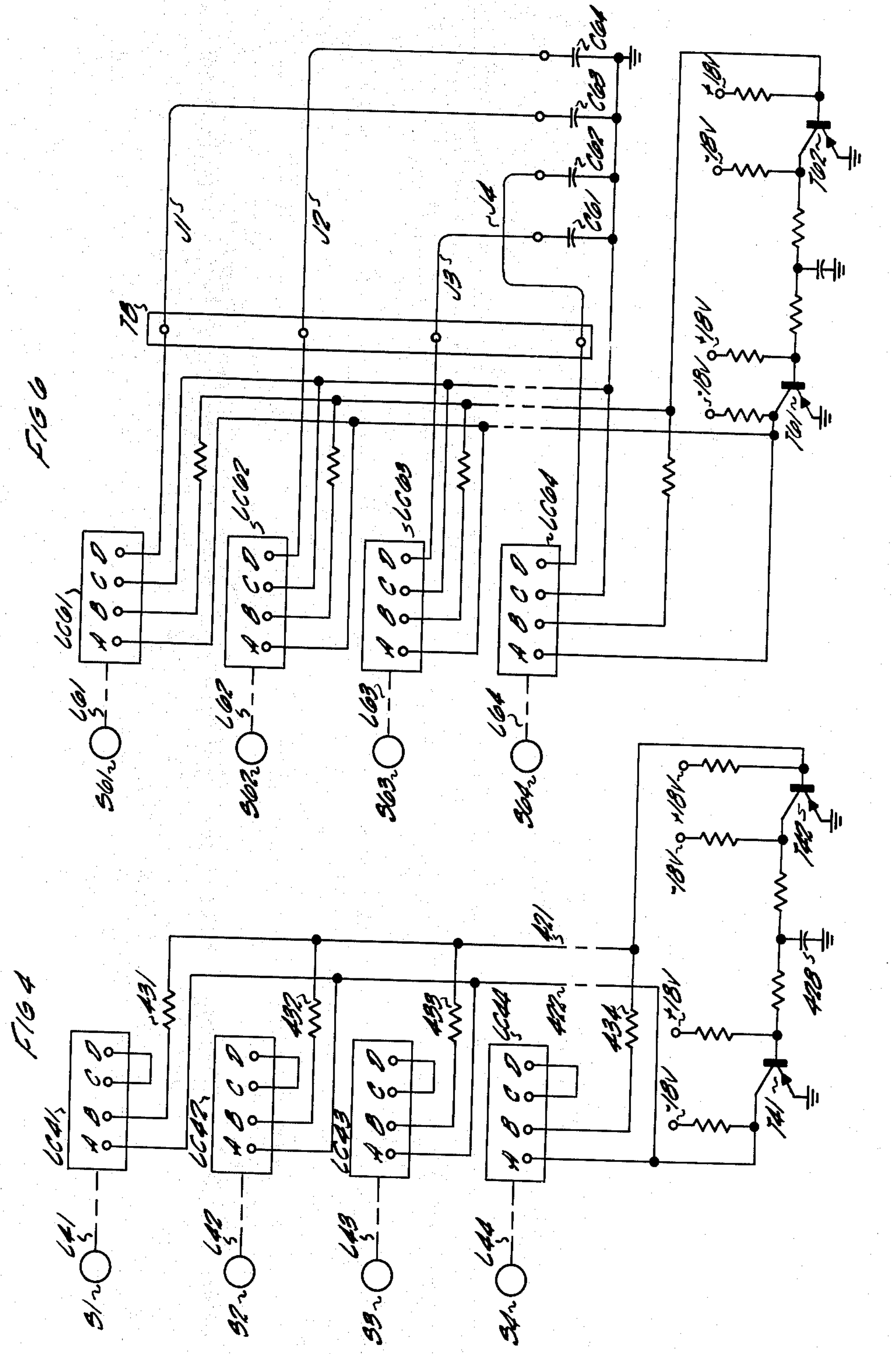
FIG. 4 shows a circuit arrangement for adapting PBX-group lines for random hunting.
FIG. 6 shows a circuit arrangement for providing sequential hunting among PBX-group lines without using a counting control.

*PBX-group random hunting, FIG. 4*

Referring now to FIG. 4 of the drawings, a description will be given of the arrangement in which a call to any line circuit of a group of lines assigned to one PBX-group will be handled on a random basis.

In FIG. 4, the terminals A of all the line circuits in the PBX-group are strapped together and connected to the collector of transistor T41 while the terminal B of such line circuits are strapped together and connected to the base of transistor T42.

Terminals C and D of each line circuit are individually strapped to each other.

Transistors T41 and T42 are similar to transistors T39 and T30 of FIG. 4 in that the appearance of a negative potential on wire 421 will switch transistor T42 from its normally "on" condition to its "off" condition. When transistor T41 is switched off, ground is removed from wire 422.

A condenser 428 is shown connected between transistors T41 and T42 to provide a slight delay between the appearance of a negative potential on wire 421 and the noted removal of ground from wire 422. This delay is introduced to permit the called one of the random-connected lines in the PBX-group to have preference over all of the remainder of lines.

When any one of the random-connected PBX-group lines is called, the terminate-input transistor thereof is switched "off" and the ground normally appearing on terminal B is replaced with a negative potential which, over wire 421, switches transistor T42 to its "on" condition. At this time, the called line circuit LC41 generates the noted firing pulse. After the noted delay caused by condenser 428, ground is removed from wire 422 and terminals A of the remaining line circuits. This results in the terminate-input transistor of each of the line circuits in the PBX-group to cause the generation of a firing pulse and all such line circuits race to fire through the switching network. However, the called line circuit had preference and if it is successful, all other line circuits are blocked.

If the called line circuit does not effectively fire through the network, the first successful one of the other line circuits could complete the called connection.

When any fire-through is completed or the time for such fire-through, as controlled by the time interval the T and U conductors are grounded, has elapsed, the negative potential on wire 421 is replaced with ground potential and transistors T41 and T42 return to their normal condition.

While FIG. 4 shows all the line circuits of the PBX-group interconnected by wires 421 and 422, it is possible to connect one line circuit as the master station by disconnecting wire 421 from all of the terminals B except the master station. In this manner, random hunting would take place only when the line circuit having the B terminal connected is called. On calls to the other line circuits under such conditions, the call would be extended to the particular called line circuit only.

Resistors 431 to 434 are isolating resistors and are used to prevent any undesirable inter-action between the line circuits.

Figure 5:
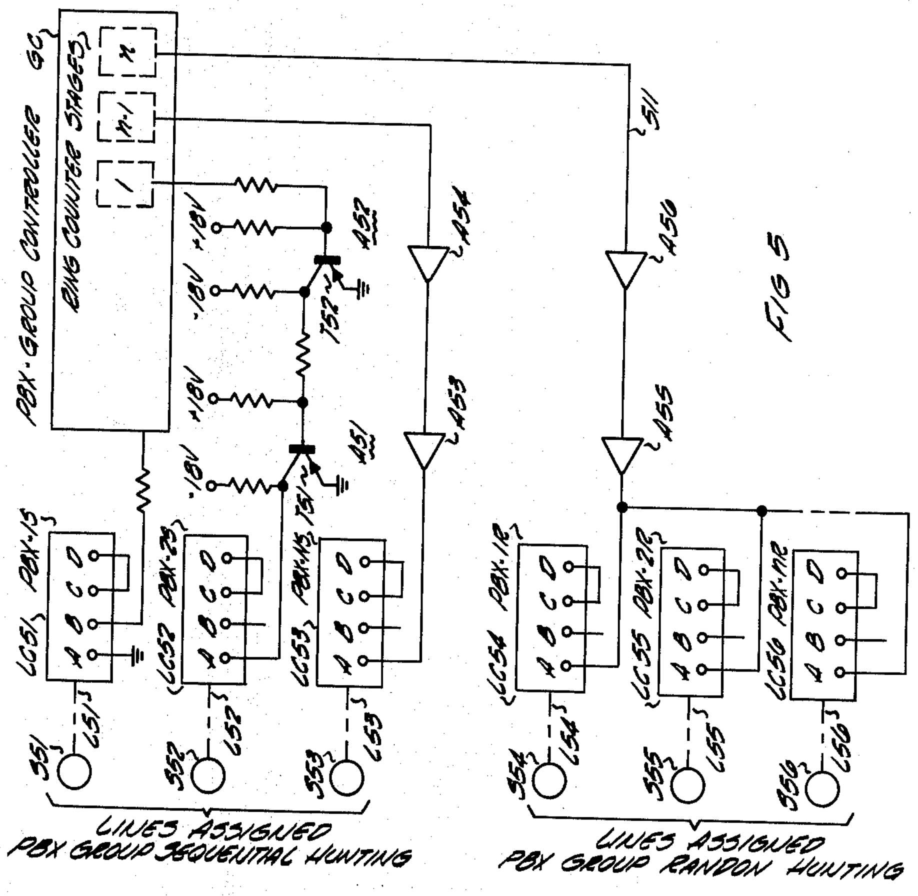
FIG. 5 shows a circuit arrangement for providing combined sequential and random huning for PBX-group lines.

*PBX-group combined sequential and random hunting, FIG. 5*

Referring now to FIG. 5 of the drawings, the description of the operation of a combined sequential and random hunting PBX-group arrangement will be described. In this figure, line circuits LC51 to LC54 are connected to the group controller GC in the same manner as the corresponding line circuits LC31 to LC34 are connected in FIG. 3. Similarly, line circuits LC55 and LC56 are connected by their A terminals to the line circuit LC54 in the manner that line circuits LC41 to LC44 of FIG. 4 are connected. All other apparatus of FIG. 5 is assumed to be similar to the corresponding apparatus of FIG. 3.

When a call is directed to line circuit LC51, the first idle one of the line circuits LC51 to LC53 will in that order be connected to the calling line in the manner previously described in connection with FIG. 3.

If none of the line circuits LC51 to LC54 are connected to the calling line, then counter stage *n* will energize wire 511 and remove ground from the terminate-input transistor of each of the line circuits LC54 to LC56 and all such line circuits will generate a firing pulse resulting in a race to fire through the network. The first successful firing through will preclude the extension of the connection by any other line circuit.

While line circuits LC54 to LC56 are shown as connected for preference on a random basis, the addition of the equivalent transistors T41 and T42 of FIG. 4 would give line circuit LC54 preference over the remaining random-connected line circuits. Such an arrangement would require the B terminals of line circuits LC54 to LC56 to be connected to the base of a transistor similar to transistor T42 of FIG. 4 and the "A" terminal of line circuits LC55 to LC56 to be connected to the collector terminal of a transistor such as T41 of FIG. 4. Additionally, isolating resistors would be needed.

*PBX-group sequential hunting, FIG. 6*

FIG. 6 of the drawings shows another embodiment of a sequential hunt PBX-group arrangement. This arrangement uses a minimum of components associated with each line circuit assigned as a PBX-group line.

The line circuits LC61 to LC64 are shown connected to a pair of transistors T61 and T62 in the same manner as the line circuits of FIG. 4 are connected to transistors T41 and T42. However, terminals C and D of each of the line circuits LC61 to LC64 are no longer strapped together to connect the condenser (**218*a*), associated with the firing pulse transistor of the line circuit, in circuit. Instead, the noted condenser 218*a* of FIG. 2 of each of the line circuits LC61 to LC64 is replaced by one of the condensers C61 to C64 in any predetermined order. Each of the condensers C61 to C64** is of a different value so that when they are connected in circuit with the firing pulse transistor, the slope of the potential rise to fire through the matrix is different for each line circuit of the PBX-group, resulting in predetermined line circuits having preference even though the terminate-input transistor of each line circuit is switched "off" simultaneously. Therefore, a preference will exist between the PBX-group lines as a result of different firing pulse delays.

Figure 7:
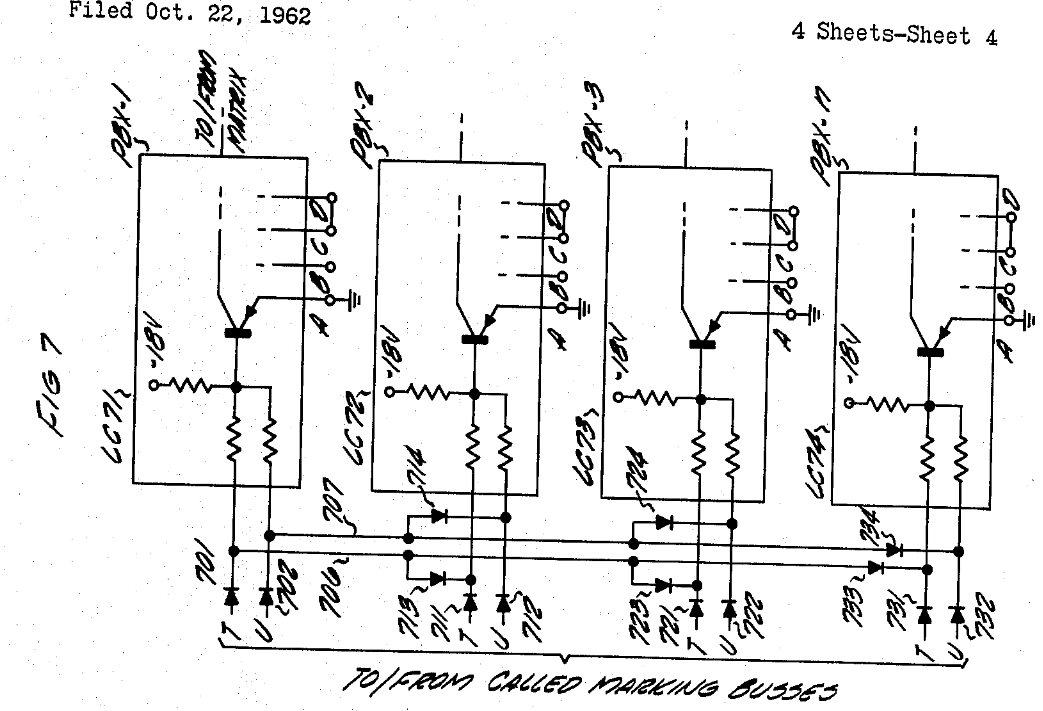
FIG. 7 shows a random-hunting PBX-group arrangement in which the assignment of lines to PBX–groups is performed externally of the line circuits involved.

*PBX-group random hunting, FIG. 7*

In FIG. 7, another random hunting type of PBX-group is disclosed. In this figure, the line circuits have the external terminals A to D connected in the same manner as the line circuit of FIG. 2. However, in addition to these connections, each T and U conductors of each line circuit, other than the master station, is connected together through isolating diodes 713, 714; 723, 724; and 733, 734. In this manner, when the first or master line circuit LC71 is called, the ground marks on the T and U conductors are extended over the multiple wires 706 and 707 to all of the line circuits of the PBX-group to cause them to each generate the noted firing pulse. Thus, when the master line circuit is called, a race for firing through the switching network exists between all line circuits.

If a line circuit other than the master line circuit LC71 is called, only the called line circuit will respond since the ground marks on the T and U leads are blocked by the noted diodes.

The diodes 701, 702; 711, 712; 721, 722; and 731, 732 are provided to isolate the noted T and U conductors of each line circuit to prevent an undesirable backup of potentials over the common T and U bus bars.

While we have described our invention in conjunction with specific apparatus and applications, it is to be understood that this description is made only by way of example and not as a limitation on the scope of the invention.

We claim:

1. In a PBX-group line hunting arrangement, a group of lines each having a separate line circuit associated therewith, means for interconnecting a predetermined number of said line circuits for PBX-group service, each idle line circuit operable when the associated line is called for completing a call connection, means for calling any busy or idlle line and control means operable responsive to the calling of any predetermined one of said lines for operating busy and idle ones of said interconnected line circuits to complete the said call connection from an idle one of said interconnected line circuits to the means for calling.

2. In a PBX-group line hunting arrangement, a group of lines each having a separate line circuit associated therewith, means for interconnecting a predetermined number of said line circuits for PBX-group service, each idle line circuit operable when the associated line is called for completing a call connection, means for calling any busy or idle line, and control means operable responsive to the calling of any predetermined one of said lines for operating busy and idle ones of said interconnected line circuits in a predetermined order of sequence to complete the said call connection from an idle one of said interconnected line circuits to the means for calling.

3. A PBX-group line-hunting arrangement as set forth in claim 2 wherein the said control means includes means for sequentially simulating a calling condition on the said interconnected line circuits associated with the other of said lines having PBX-group service.

4. A PBX-group line-hunting arrangement as set forth in claim 3 wherein the said means for sequentially simulating a calling condition comprises distributor means and means for operating it step-by-step to sequentially transfer the said simulated calling condition to the last said lines on a one-at-a-time basis.

5. In a PBX-group line hunting arrangement, a group of lines each having a separate line circuit associated therewith, means for interconnecting a predetermined number of said line circuits for PBX-group service, each idle line circuit operable when the associated line is called for completing a call connection, means for calling any busy or idle line, and control means operable responsive to the calling of any predetermined one of said lines for operating busy and idle ones of said interconnected line circuits in a random order to complete the said call connection from an idle one of said interconnected line circuits to the means for calling.

6. A PBX-group line hunting arrangement as set forth in claim 5 wherein said control means includes means for providing call completion preference to the specific line called.

7. A PBX-group line hunting arrangement as set forth in claim 5 wherein said control means includes means for simultaneously simulating a calling condition on the said interconnected line circuits of all PBX-group lines.

8. A PBX-group line hunting arrangement as set forth in claim 5 wherein said control means includes means for simultaneously simulating a calling condition on the said interconnected line circutis of all PBX-group lines excepting the specific called line.

9. A PBX-group hunting arrangement as set forth in claim 5 wherein each line circuit includes an input circuit and wherein the said means for interconnecting predetermined ones of said line circuits includes multipling means for connecting the said input circuits in parallel.

10. A PBX-group huuting arrangement as set forth in claim 9 wherein unidirectional current carrying devices are provided to isolate each line circuit excepting one from all other said interconnected line circuits.

11. In a PBX-group line hunting arrangement, a group of lines each having a separate line circuit associated therewith, means for interconnecting a predetermined number of said line circuits for PBX-group service, each idle line circuit operable when the associated line is called for completing a call connection, means for calling any idle or busy line, and control means operable responsive to the calling of a predetermined line for operating certain of the busy and idle ones of said interconnected line circuits in a predetermined order of sequence and for operating thereafter the remainder of said busy and idle ones of said interconnected line circuits in a random order to complete the said call connection from an idle one of said interconnected line circuits to said means for calling.

12. A PBX-group line hunting arrangement as set forth in claim 11 wherein said control means includes means for providing call completion preference to the specific called line.

13. A PBX-group line-hunting arrangement as set forth in claim 11 wherein the said control means includes means for sequentially simulating a calling condition on the line circuits of the said certain line circuits and for thereafter simultaneously simulating a calling condition on the said remaining line circuits.

14. A PBX-group line hunting arrangement as set forth in claim 13 wherein the said means for sequentially and thereafter simultaneously simulating a calling condition include a multi-stage allotter operable step-by-step with the said simultaneous simulation of a calling condition on the remaining lines being controlled by the last stage of said counter.

15. In a PBX-group hunting arrangement as set forth in claim 2, means in said control means for simultaneously simulating a calling condition on each of said interconnected line circuits and means for delaying the operation of each said interconnected line circuits for a different time interval to provide call completion preference to said interconnected line circuits in a predetermined sequence.

16. A PBX-group hunting arrangement as set forth in claim 15, wherein the said means for delaying the operation of each said interconnected line circuits a different time interval, includes individual different-valued capacitor means associated with each said line circuit.

17. A PBX-group hunting arrangement as set forth in claim 15 wherein means is provided for affording call completion preference to the specific called line irrespective of the length of said delay intervals.

References Cited by the Examiner

UNITED STATES PATENTS

| | | | |
|---|---|---|---|
| 2,761,904 | 9/1956 | Mauge | 179—18 |
| 2,840,641 | 6/1958 | Allum et al. | 179—18 |
| 2,882,344 | 4/1959 | Henquet et al. | 179—18 |
| 2,904,637 | 9/1959 | Williams | 179—18 |
| 3,038,969 | 6/1962 | Pickering et al. | 179—18 |
| 3,051,794 | 8/1962 | Lass | 179—18 |
| 3,059,057 | 10/1962 | Lurk et al. | 179—18 |

ROBERT H. ROSE, *Primary Examiner.*

WILLIAM C. COOPER, *Examiner.*